United States Patent
Breitzke et al.

(10) Patent No.: US 9,127,237 B2
(45) Date of Patent: Sep. 8, 2015

(54) SURFACTANT COMPOSITIONS (75) Inventors: Burkhard Breitzke, Essen (DE); Britta Jakobs-Sauter, Langenfeld (DE); Clemens Schröder, Kayhude (DE); Udo Schoenkaes, Haltern am See (DE); Giuseppe Giuffrida, Milan (IT); Lee Matheson, Lake Charles, LA (US); Kermit Kinsley, Orange, TX (US); Michael Cox, Georgetown, TX (US); Geoffrey Lynn Russell, Sulphur, LA (US); John Barry Winder, Lake Charles, LA (US)

(73) Assignee: Sasol Germany GmbH, Hamburg (DE)

(*) Notice: Subject to any disclaimer, the term of this patent is extended or adjusted under 35 U.S.C. 154(b) by 400 days.

(21) Appl. No.: 13/170,929

(22) Filed: Jun. 28, 2011

(65) Prior Publication Data

US 2013/0005626 A1   Jan. 3, 2013

(51) Int. Cl.
| | |
|---|---|
| *C10M 135/10* | (2006.01) |
| *C11D 1/22* | (2006.01) |
| *C10M 159/24* | (2006.01) |
| *C10M 105/72* | (2006.01) |
| *C09K 8/36* | (2006.01) |

(Continued)

(52) U.S. Cl.
CPC ... *C11D 1/22* (2013.01); *C09K 8/36* (2013.01); *C09K 8/40* (2013.01); *C09K 8/52* (2013.01); *C09K 8/584* (2013.01); *C09K 8/602* (2013.01); *C09K 8/64* (2013.01); *C10M 105/72* (2013.01); *C10M 135/10* (2013.01); *C10M 159/24* (2013.01); *C10M 2201/062* (2013.01); *C10M 2201/081* (2013.01); *C10M 2201/084* (2013.01); *C10M 2201/103* (2013.01); *C10M 2219/044* (2013.01); *C10N 2230/12* (2013.01); *C10N 2240/40* (2013.01)

(58) Field of Classification Search
CPC .............. C10M 2219/044; C10M 2219/0445; C07C 309/31
USPC .............................. 508/390; 252/395; 558/56
See application file for complete search history.

(56) References Cited

U.S. PATENT DOCUMENTS

| 4,174,305 A | 11/1979 | Burns et al. | |
|---|---|---|---|
| 4,645,623 A * | 2/1987 | Dolan et al. | .................. 510/428 |

(Continued)

FOREIGN PATENT DOCUMENTS

| EP | 0364012 | 1/1993 |
|---|---|---|
| EP | 1002029 | 5/2003 |

(Continued)

*Primary Examiner* — Ellen McAvoy
(74) *Attorney, Agent, or Firm* — Bushman Werner, P.C.

(57) ABSTRACT

A surfactant composition comprising alkylarylsulfonate molecules wherein more than 30 wt. % of the alkylarylsulfonate molecules of the surfactant composition are species of the formula:

$$[R-X-Ar(SO_3)^-]_a[M^{n+}]_b$$

wherein:
X is a linear acyclic aliphatic hydrocarbyl chain;
R is bound to a non-terminal carbon atom of X and is selected from H and C1 to C3 alkyl groups;
X and R together have 10 or less carbon atoms, preferably 9 or 10 carbon atoms, most preferably 10 carbon atoms;
Ar is an aromatic group;
M is a cation or cation mixture,
n is selected from 1, 2 and 3; and
a and b are selected such that the alkylarylsulfonate molecule is electroneutral.

13 Claims, 7 Drawing Sheets

(51) Int. Cl.
*C09K 8/40* (2006.01)
*C09K 8/52* (2006.01)
*C09K 8/584* (2006.01)
*C09K 8/60* (2006.01)
*C09K 8/64* (2006.01)

(56) References Cited

U.S. PATENT DOCUMENTS

| | | | |
|---|---|---|---|
| 4,687,593 A * | 8/1987 | Dolan et al. | 252/182.31 |
| 5,026,933 A | 6/1991 | Blain et al. | |
| 6,083,897 A * | 7/2000 | Lewis et al. | 510/351 |
| 6,133,217 A * | 10/2000 | Lewis et al. | 510/351 |
| 6,506,717 B1 * | 1/2003 | Kott et al. | 510/357 |
| 6,525,233 B1 * | 2/2003 | Connor et al. | 585/448 |
| 6,602,840 B1 * | 8/2003 | Scheibel et al. | 510/357 |
| 7,008,914 B2 * | 3/2006 | Smith et al. | 510/352 |
| 7,601,861 B2 * | 10/2009 | Bottke et al. | 558/56 |
| 7,745,381 B2 * | 6/2010 | Valencia Sil et al. | 508/208 |

FOREIGN PATENT DOCUMENTS

| | | |
|---|---|---|
| EP | 2233461 | 9/2010 |
| GB | 917432 | 2/1963 |
| GB | 1068528 | 5/1967 |
| WO | WO2007/121999 | 4/2007 |

* cited by examiner

SURFACTANT COMPOSITIONS

BACKGROUND TO THE INVENTION

This invention relates to improved surfactant compositions.

Alkylbenzene sulfonates, the sulfonated derivatives of alkylbenzenes, are known surfactants commonly used in a variety of applications where surfactants are required (detergents, hard-surface cleaners, drilling fluids, cutting fluids, etc.). An alkylbenzene molecule includes an acyclic aliphatic alkyl chain, typically produced by distilling a boiling range fraction of hydrocarbons from a petroleum based feedstock. This boiling range fraction typically contains mostly hydrocarbons having between 10 and 13 carbon atoms per molecule (C10-C13 hydrocarbons). This alkyl chain is typically dehydrogenated and alkylated with benzene to form alkylbenzene, the hydrophobic portion of the alkylbenzenesulfonate molecule. The alkylbenzene molecule is further derivatized, typically via sulfonation with sulfur trioxde, to produce the alkylbenzenesulfonate, where the sulfonate group is attached to the benzene portion of the alkylbenzene, and is the hydrophilic portion of the surfactant molecule.

Historically, highly branched alkylbenzenesulfonate (ABS) surfactants were used in detergents. However, these were found to be poorly biodegradable and were replaced by linear alkylbenzenesulfonates (LAS), which are readily biodegradable. Further improvements to LAS include the production of "modified LAS", or "MLAS" (MLAS), which consists of 2 modifications to the LAS molecule: a higher concentration of the 2-phenyl isomer, which improves surface activity, and the introduction of a limited amount of methyl-branching in the alkyl chain, which improve solubility.

Although typical alkylbenzenesulfonates are popular due to their availability and excellent cost/performance attributes, they are prone to interaction with hard-water ions (calcium & magnesium ions), which effectively reduces their solubility, and therefore their ability to act as surface active agents. Colder temperatures exacerbate this effect. Even C10-13 MLAS, although improved in terms of surface activity and solubility, is negatively impacted by water hardness ions and/or colder water temperatures.

In order to evaluate the effectiveness of surfactant or detergent compositions, it would therefore be important to measure various performance parameters such as intrinsic detergency performance (cleaning ability), $Ca^{2+}$ (water hardness) tolerance, surface activity, salt (NaCl) tolerance and cold water detergency performance.

A test of Intrinsic Detergency gives an indication of a surfactant's cleaning ability, and is therefore a test of detergency performance. The $Ca^{2+}$ tolerance/turbidity measurement provides information on the level of soluble surfactant available for interfacial activity in dependence of the water hardness. With increasing water hardness (increasing amounts of calcium ions) the solubility of LAS type surfactants usually decreases; the surfactant starts to precipitate and the solution becomes turbid.

In order to evaluate the interfacial activity of a surfactant composition, the surface tension of surfactant compositions can be determined in dependence of the water hardness. This measurement determines the optimum solubility conditions for the given surfactant in order to maximize interfacial activity.

The dynamic surface tension measurement is the determination of the surface tension (or interfacial activity) in dependence of the surface age. Especially for dynamic processes like washing and cleaning the dynamic properties of a surfactant are even more important than the static ones.

Salt (NaCl) tolerance is determined by measuring solubility of the surfactant in solutions of high ionic strength. The measurement of the transparency of the solution gives an indication of the surfactant's solubility at a specific salt concentration. High salt tolerance would be important for technical applications where high salt loads are found. Examples include enhanced oil recovery (EOR), emulsion polymerization or metal working fluids.

Lastly, it would also be important to evaluate a surfactant's cold water detergency performance by determining its ability to remove solid soil under cold water conditions.

It is an object of this invention to provide new surfactant compositions that, apart from being readily biodegradable, soluble and having good surface activity, have significantly improved hard water tolerance, good physical application (washing) properties at higher water hardness and low temperature conditions, and have excellent tolerance to ionic strength.

SUMMARY OF THE INVENTION

According to the present invention, there is provided a surfactant composition comprising alkylarylsulfonate molecules wherein more than 30 wt. %, preferably more than 40 wt. %, most preferably more than 50 wt. %, of the alkylarylsulfonate molecules of the surfactant composition are species of the formula:

wherein:

X is a linear acyclic aliphatic hydrocarbyl chain;

R is bound to a non-terminal carbon atom of X and is selected from H and C1 to C3 alkyl groups;

X and R together have 10 or less carbon atoms, preferably 9 or 10, most preferably 10 carbon atoms;

Ar is an aromatic group, preferably phenyl;

M is a cation, typically an alkali metal such as $Na^+$, or other cations such as $Ca^{2+}$, $Mg^{2+}$, $K^+$, $NH^{4+}$, amines such as mono-isopropyl amines or other nitrogen-containing cations, or a cation mixture, n is selected from 1, 2 and 3; and a and b are selected such that the alkylarylsulfonate molecule is electroneutral.

Preferably, more than 40 wt. %, more preferably more than 60 wt. %, most preferably more than 70 wt. % of the alkylarylsulfonate molecules of the surfactant composition have the phenyl group bound to the carbon atom which is bound to either of the two terminal carbon atoms of X (the beta position on the hydrocarbyl chain X), i.e. at the 2-phenyl isomer position.

Preferably more than 10 wt. %, preferably more than 20 wt. %, most preferably more than 50 wt. % of the alkylarylsulfonate molecules of the surfactant composition include an R which is methyl or ethyl, most preferably methyl.

Preferably, the alkylarylsulfonate is alkylbenzenesulfonate.

The surfactant composition may further comprise one or more additives selected from the group consisting of:
 a. co-surfactants
 b. fillers
 c. water-soluble polymers
 d. enzymes
 e. builders,
 f. bleaches
 g. acids h. bases
i. fragrances and
j. other agents designed to adjust pH, viscosity characteristics and solubility.

The surfactant composition may further comprise other alkylarylsulphonate species or isomeric mixtures of alkylarylsulphonate. The composition may include an isomeric mixture of molecules having an acyclic aliphatic hydrocarbon chain (hydrophobe) with from 9 to 14 carbon atoms per molecule. Such "conventional" alkylarylsulphonate mixtures typically comprise a distribution of molecules by number of carbon atoms in their hydrophobe chain. Typically this distribution includes from 10-25 wt. % of molecules having 10 carbon atoms in the hydrophobe chain. The composition may also include an isomeric mixture of molecules having the same number of C11 to C14 carbon atoms in its hydrophobe chain, e.g. a mixture of molecules having 12 carbon atoms in its hydrophobe chain. Such mixtures are commercially produced for example by oligomerisation of butene.

The surfactant composition may comprise a ratio of alkylarylsulphonate species according to the invention; and species other alkylarylsulphonate molecules of greater than 30:70, preferably greater than 30:70, up to a ratio of 50:50.

The invention also covers the use of the surfactant compositions described above as surfactants in aqueous solution.

The aqueous solution may have a high $Ca^{2+}$ or $Mg^{2+}$ concentration above 50 ppm, above 90 ppm, especially above 135 ppm, above 180 ppm, and even above 300 ppm.

The aqueous solution may have a high ionic strength; for example, a concentration of NaCl above 3%, especially above 4% and even above 6%.

The aqueous solution may be at a temperature of 5-65° C., preferably 10-40° C.

The surfactant compositions described above find particular application as a laundry detergent, especially to remove solid soil under cold water conditions (10-40° C.).

According a further aspect of the present invention, the surfactant compositions could be applied, but is not limited to, use in oilfield and enhanced oil recovery (EOR) applications, such as chemical EOR surfactants, flow back improvers, wetting agents, dispersants, emulsifying agents, drilling fluids, fracturing fluids, spacer fluids, drill cuttings cleaning, well bore cleaning, foamers for drilling fluids Still further examples could include metal working applications and lubricant use, such as dispersing agents, anti-rust agents, refrigeration lubricants, neutralizing agents, base oils or over-based sulfonates as calcium salts.

Applications could also include use in textile processing, paints, inks, coatings and adhesives, such as for emulsion polymerization, pigment dispersants and wetting aids, crop protection formulations or any other application where surface active properties are desired.

The invention also relates to a composition comprising alkylaryl molecules wherein more than 30 wt. %, preferably more than 40 wt. %, most preferably more than 50 wt. %, of the alkylaryl molecules of the composition are of the formula:

R—X—Ar wherein:
X is a linear acyclic aliphatic hydrocarbyl chain
R is bound to a non-terminal carbon atom of X and is selected from H and C1 to C3 alkyl groups;
X and R together have 10 or less carbon atoms, preferably 9 or 10, most preferably 10 carbon atoms;
Ar is an aromatic group, preferably phenyl;
especially for use in the manufacture of a surfactant composition containing alkylarylsulfonate molecules.

Preferably, more than 40 wt. %, more preferably more than 60 wt. %, most preferably more than 70 wt. % of the alkylaryl molecules of the composition have the phenyl group bound to the carbon atom which is bound to either of the two terminal carbon atoms of X (the alpha position relative to either terminal carbon atom); this is commonly referred to as the "2-phenyl" isomer position.

Preferably more than 10 wt. %, preferably more than 20 wt. %, most preferably more than 50 wt. % of the alkylaryl molecules of the composition has an R, which is methyl or ethyl, most preferably methyl.

Preferably, the alkylaryl molecules are alkylbenzene.

BRIEF DESCRIPTION OF THE DRAWINGS

Advantages of the present invention will become apparent to those skilled in the art upon reference to the following figures, the detailed description of specific embodiments, as well as from the examples given below.

DESCRIPTION OF PREFERRED EMBODIMENTS

This invention relates to surfactant compositions comprising linear alkylbenzenesulfonate (LAS), and in particular modified alkylbenzenesulfonate (MLAS) which is LAS that has been modified by methyl branching (typically 50+%) and a high distribution of the phenyl isomer at the 2-phenyl isomer position (typically 80+%).

The preparation of MLAS requires two things outside what is normally used to make standard LAS, and those are a source of branched paraffin or olefin, and an alkylation catalyst that will provide a high 2-phenyl isomer content. Commercial LAS is traditionally produced by first extracting linear paraffin from kerosene, and then dehydrogenating the paraffin to produce olefins, which are then alkylated with benzene to produce linear alkylbenzene (LAB), which is then sulfonated with oleum or an $SO_3$-air mixture to form LAS. Methyl-branched paraffin may be produced by isomerizing linear paraffin to form branched paraffin; or shorter chain olefins could be dimerized to form branched olefin. In addition, branched paraffin and/or branched olefin could be selectively extracted from fuels streams.

The surfactant compositions of the present invention were specifically evaluated with regard to various performance parameters such as intrinsic detergency performance (cleaning ability), $Ca^{2+}$ (water hardness) tolerance, surface activity and salt (NaCl) tolerance. In addition, the performance of the surfactant compositions of the invention was also determined for cold water soil removal.

Figure 1:
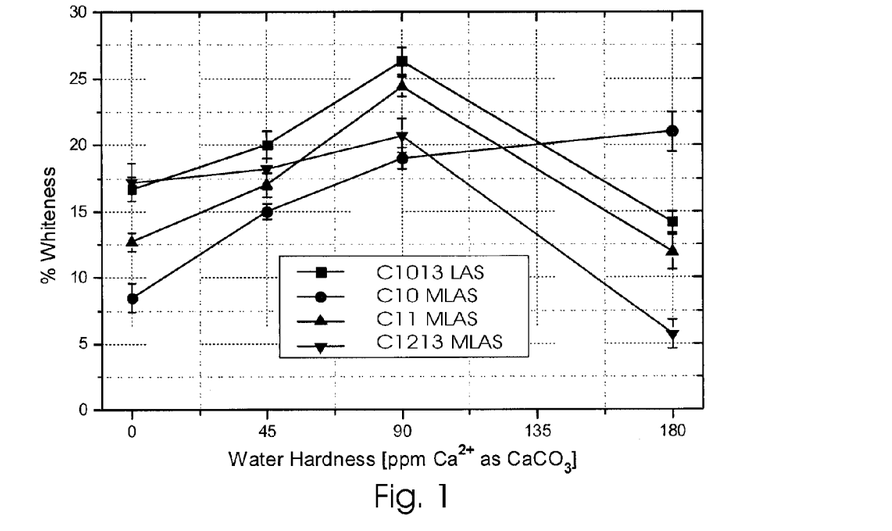
FIG. 1 is a graph showing the intrinsic detergency of C10 MLAS in comparison to other LAS species, at 40° C.

With reference to FIG. 1, the test of intrinsic detergency at 40° C. shows that the C10 MLAS of the invention, has a lower performance at lower $Ca^{2+}$ concentrations (below 90 ppm), when compared to other surfactant samples, being a C1013 LAS sample, a C11 MLAS sample and a C1213 MLAS sample. The C10 MLAS however surprisingly shows increasingly higher performance at higher $Ca^{2+}$ concentrations of above 90 ppm, especially above 135 ppm and up to at least 180 ppm.

Figure 2:
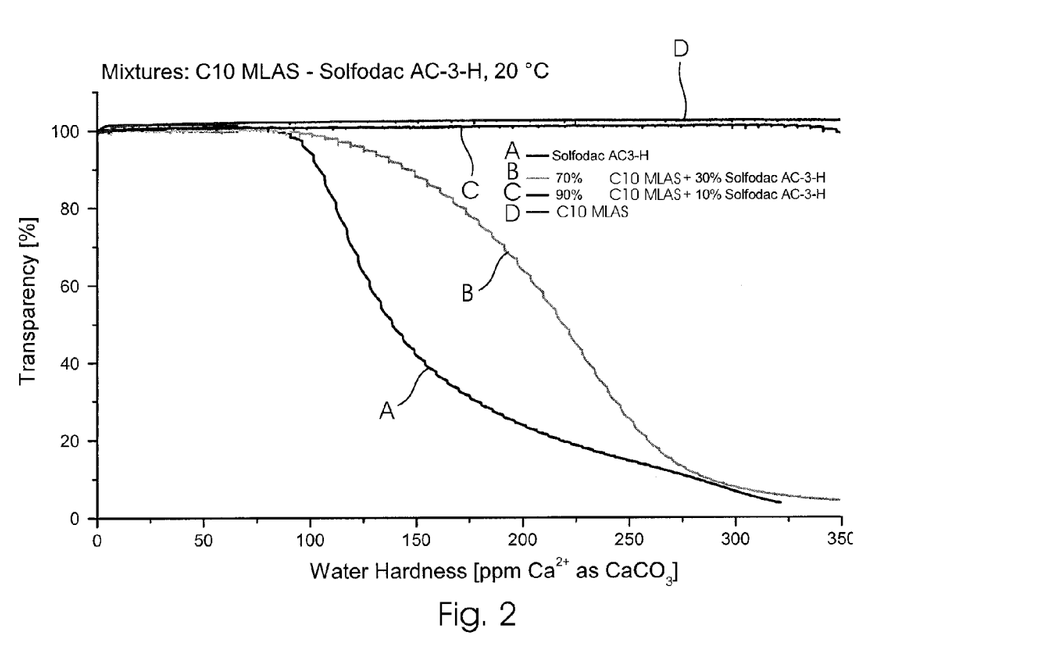
FIG. 2 is a graph showing the calcium tolerance of mixtures of C10 MLAS and C1013 LAS at 20° C.

FIG. 2 shows the beneficial effect of the C10 MLAS above the commercial LAS (Solfodac® AC-3-H) in solutions containing increased $Ca^{2+}$ concentrations (increased water hardness). In addition, this figure shows the synergistic effect of mixing 70 wt. % and higher amounts of C10 MLAS with commercial LAS, to obtain the benefit of improved hard water tolerance for commercial LAS. The effect is already visible at 150 ppm $Ca^{2+}$, especially above 200 ppm $Ca^{2+}$ and up to at least 250 ppm $Ca^{2+}$.

Figure 3:
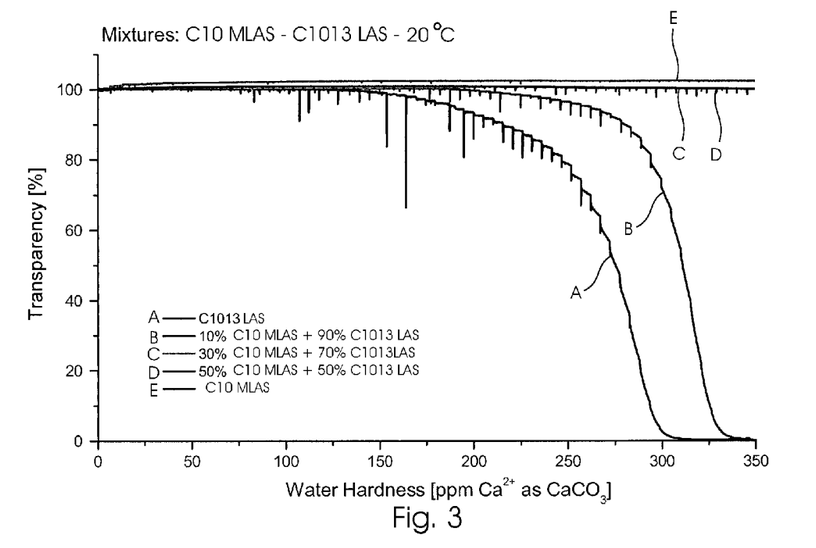
FIG. 3 is a graph showing the calcium tolerance of mixtures of C10 MLAS and C1013 LAS at 20° C.
Figure 4:
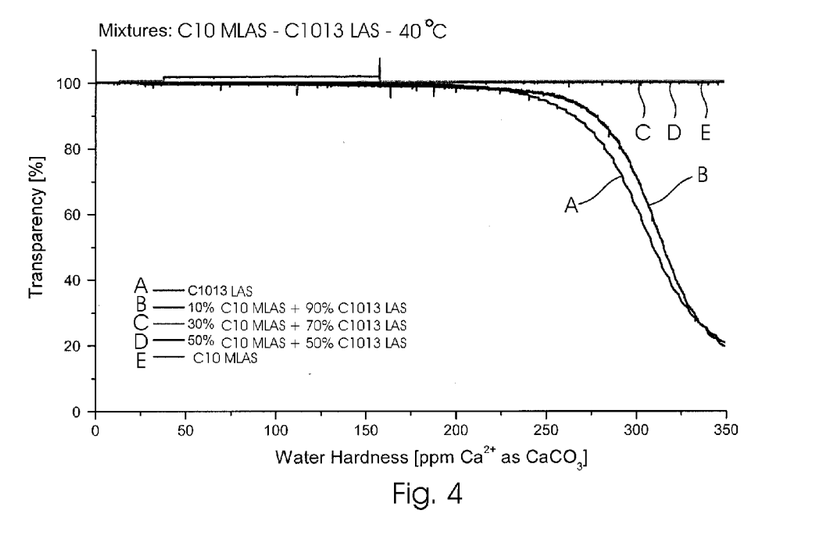
FIG. 4 is a graph showing the calcium tolerance of mixtures of C10 MLAS and C1013 LAS at 40° C.

FIG. 3 shows the beneficial effect of the C10 MLAS when mixed with C1013 LAS already when only 10% of C10 MLAS was added (in a solution containing approx. 175 ppm $Ca^{2+}$). The 50/50 mixture shows results very similar to the results of the 100% C10 MLAS test, and the effect is significant up to at least 350 ppm $Ca^{2+}$. The commercial C1013 LAS comprises 10.5 wt. % C10 molecules, and this figure therefore also shows the benefit of a detergent composition comprising linear alkylbenzenesulfonate (LAS), the LAS molecule comprising a phenyl group attached to a hydrocarbon chain; wherein more than 30 wt. %, preferably more than 40 wt. %, most preferably more than 50 wt. %, of the LAS molecules have a hydrocarbon chain that is C10. This figure further shows the benefit that can be obtained by of mixing C10 MLAS with C1013 LAS to increase the C10 content of the detergent composition, and to obtain improved hard water tolerance for LAS. FIG. 4 shows a similar trend with the same tests conducted at a higher temperature of 40° C.

Another important aspect, based on the data described above, is the potential to utilize a broader array of sulfonate salts, including calcium and magnesium salts. The ability to remain soluble at high water hardness correlates to the ability to offer the sulfonate as the calcium and/or magnesium salt (or other like cations) because these salts, in contrast to calcium and magnesium salts of conventional LAS, are adequately water soluble for formulation and use.

Figure 5:
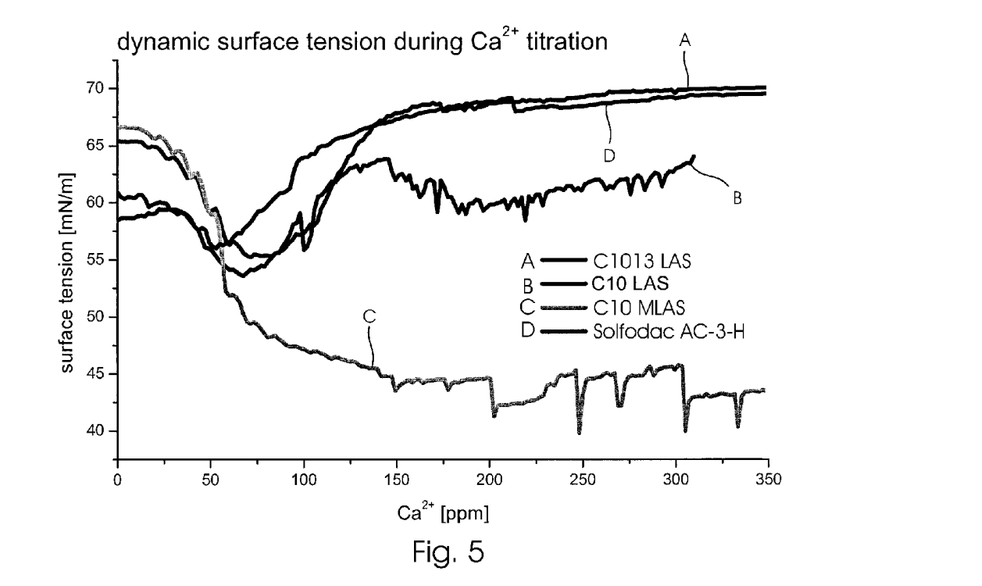
FIG. 5 is a graph showing dynamic surface tension curves for C10 MLAS in comparison to other LAS species.

FIG. 5 shows that C10 LAS and particularly C10 MLAS have better surface tension qualities at higher $Ca^{2+}$ concentrations than C1013 LAS and commercial LAS (Solfodac® AC-3-H). This effect is already visible for C10 MLAS at $Ca^{2+}$ concentrations of 50 ppm, and especially above 150 ppm, when compared to the other LAS species.

Figure 6:
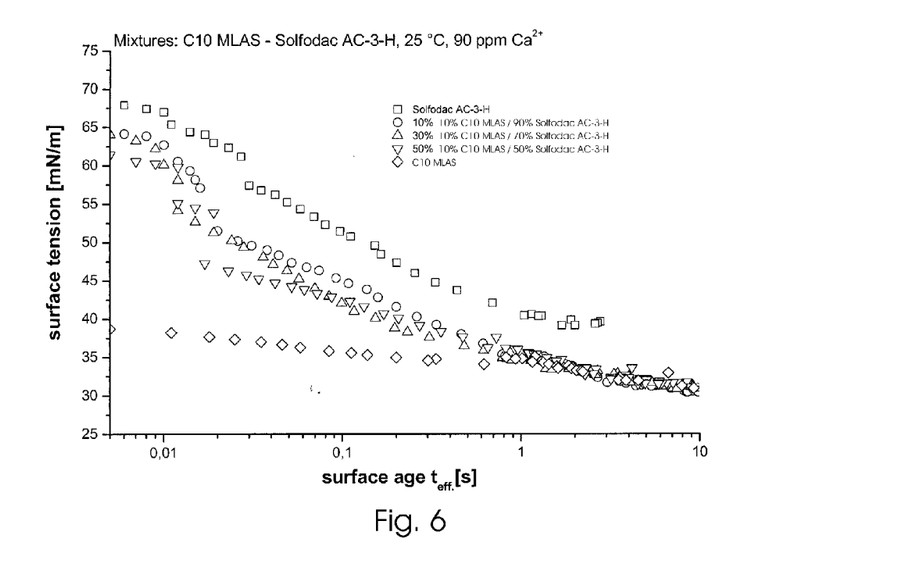
FIG. 6 is a graph showing surface tension values against surface age of mixtures of C10 MLAS and C1013 LAS at 25° C. and 90 ppm $Ca^{2+}$.
Figure 7:
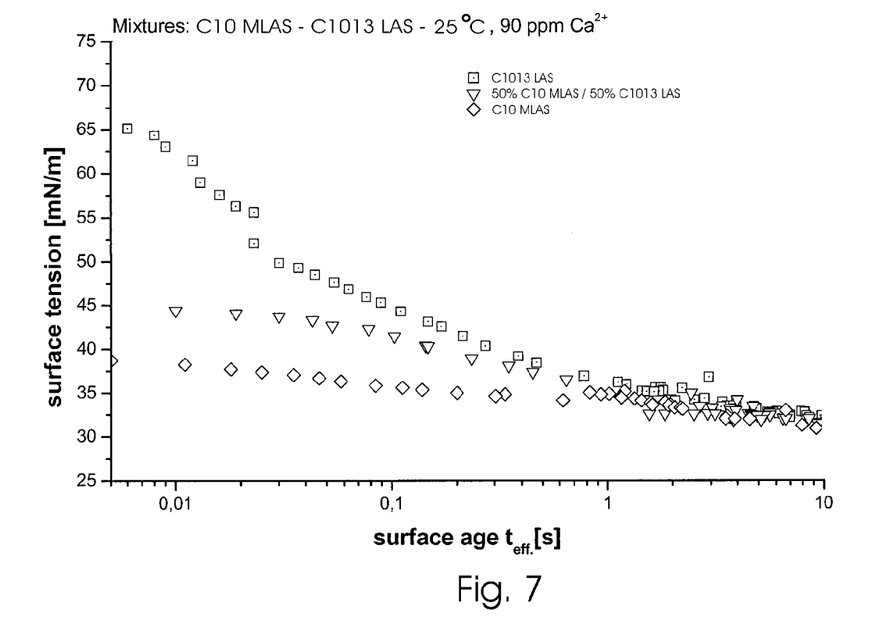
FIG. 7 is a graph showing surface tension values against surface age of mixtures of C10 MLAS and C1013 LAS at 25° C. and 90 ppm $Ca^{2+}$.

FIG. 6 shows that mixtures of C10 MLAS and commercial LAS (Solfodac® AC-3-H) show lower surface tension (s.t.) values than pure Solfodac already at 10 wt. % of C10 MLAS. These experiments were carried out at a fixed $Ca^{2+}$ concentration of 90 ppm, and the surface tension was monitored with regard to surface age. In addition, mixtures of C10 MLAS and C1013 LAS also show a good improvement on surface activity vs surface age at 50 wt. % of C10 MLAS in FIG. 7. This is especially true for young surfaces (short times) approaching the static values. This effect levels out because at longer times the longer chained materials also reach low surface tensions. FIGS. 6 and 7 thus show a further benefit relating to interfacial activity that can be obtained by mixing C10 MLAS with other LAS species such as commercial LAS and C1013 LAS.

Figure 8:
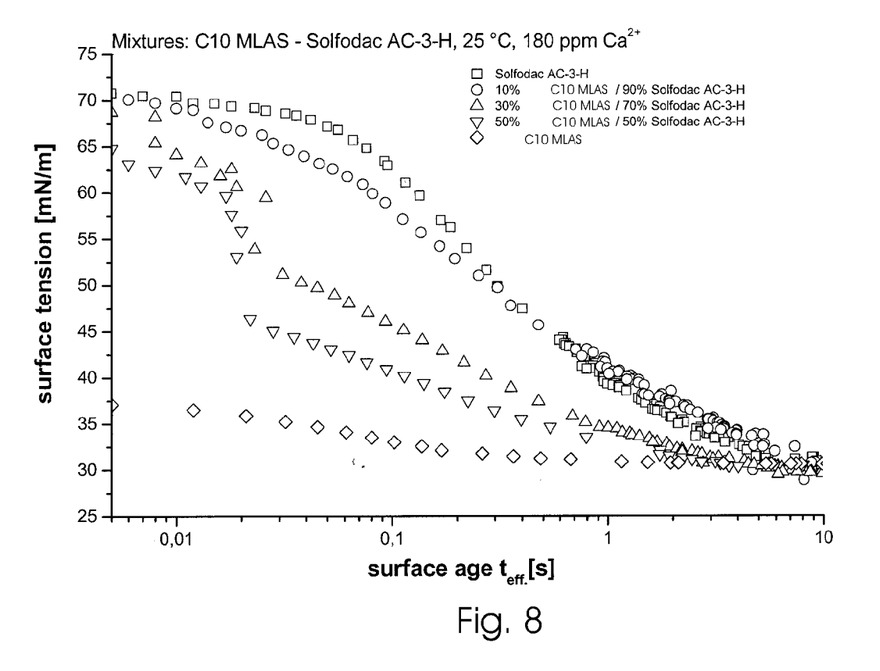
FIG. 8 is a graph showing surface tension values against surface age of mixtures of C10 MLAS and C1013 LAS, at 25° C. and 180 ppm $Ca^{2+}$.
Figure 9:
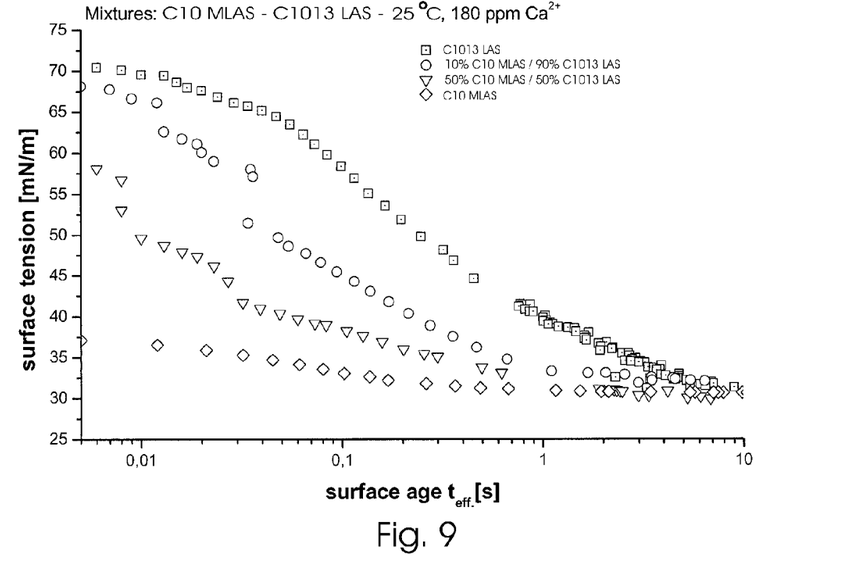
FIG. 9 is a graph showing surface tension values against surface age of mixtures of C10 MLAS and C1013 LAS at 25° C. and 180 ppm $Ca^{2+}$.
Figure 10:
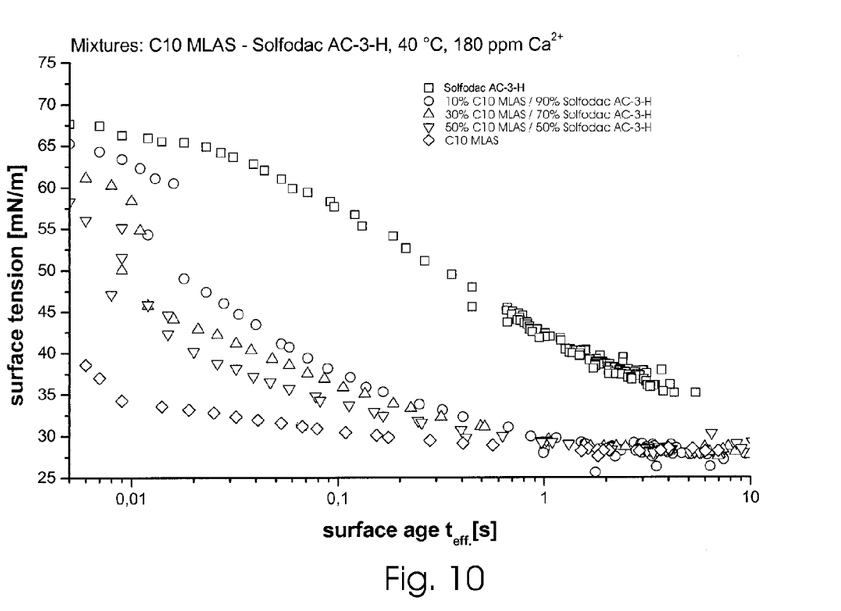
FIG. 10 is a graph showing surface tension values against surface age of mixtures of C10 MLAS and C1013 LAS at 40° C. and 180 ppm $Ca^{2+}$.
Figure 11:
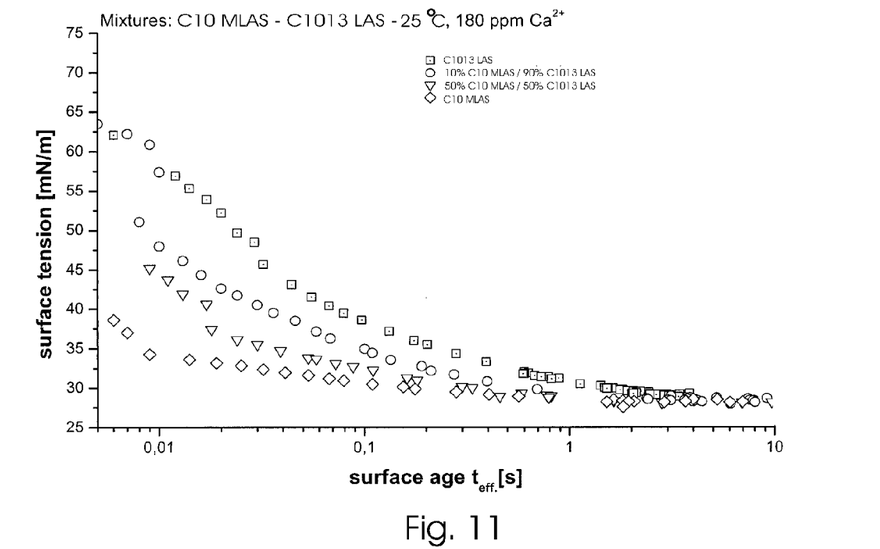
FIG. 11 is a graph showing surface tension values against surface age of mixtures of C10 MLAS and C1013 LAS at 40° C. and 180 ppm $Ca^{2+}$.

FIGS. 8-11 confirm the benefit relating to interfacial activity (lower surface tension), monitored with regard to surface age, at even higher water hardness levels (180 ppm $Ca^{2+}$), that can be obtained by mixing C10 MLAS with other LAS species such as commercial LAS (Solfodac® AC-3-H) and C1013 LAS. FIG. 8 shows a significant benefit already from addition of 30 wt. % C10 MLAS to commercial LAS (Solfodac®), whereas FIG. 9 displays a clear advantage with addition of 10 wt. % C10MLAS to C1013 LAS. Overall performance was somewhat higher at 40° C. than 25° C., as shown in FIGS. 10 and 11.

Figure 12:
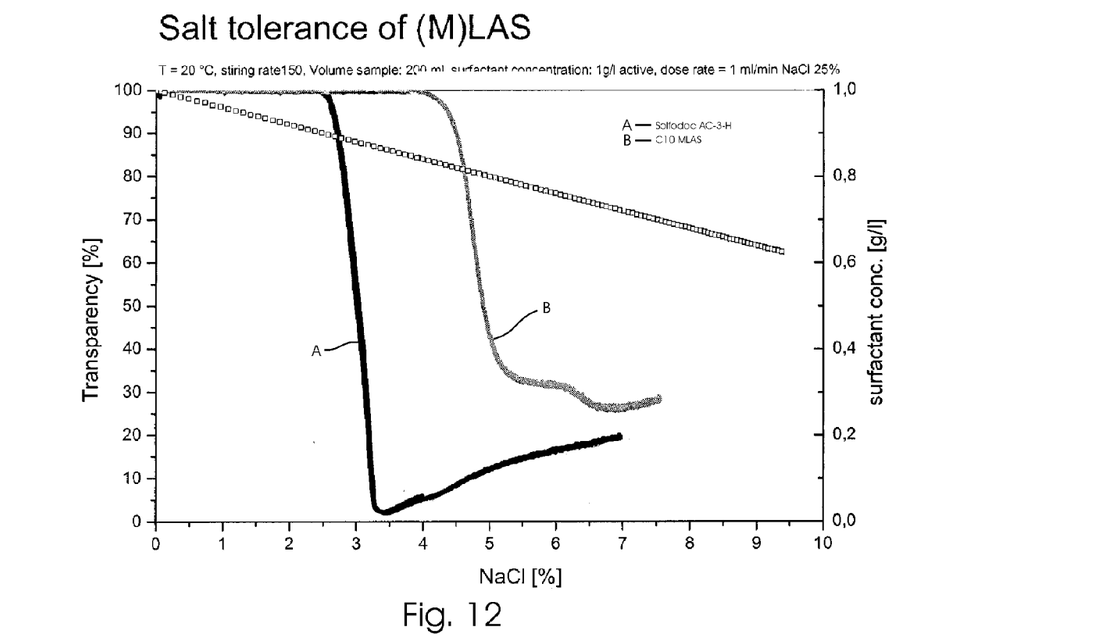
FIG. 12 is a graph showing the salt tolerance of C10 MLAS in comparison to other LAS species.

FIG. 12 shows that C10 MLAS is less affected by high salt load (NaCl), compared to commercial LAS (Solfodac® AC-3-H). There was a precipitation of conventional LAS (Sulfodac™) to be found at about 3% NaCl concentration, whereas the C10 MLAS did not start to precipitate before a salt load of almost 5%. The mixtures also showed better salt tolerance than the conventional LAS.

Figure 13:
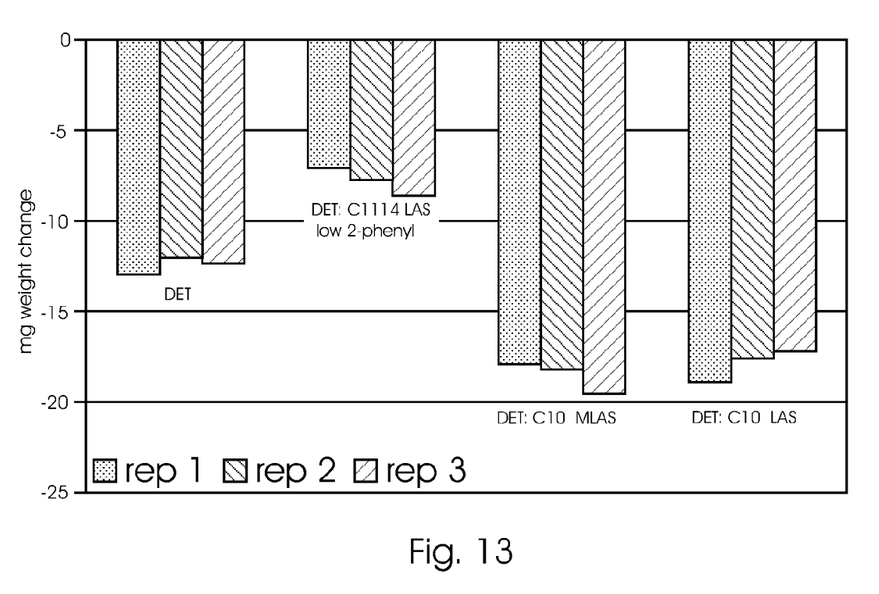
FIG. 13 is a graph showing the benefit of adding C10 MLAS and C10 LAS to a conventional laundry detergent, to remove solid soil under cold water conditions.

FIG. 13 shows the benefit of adding C10 MLAS and C10 LAS to a conventional laundry detergent mixture (DET) to facilitate cold water detergency, in particular to remove solid soil under cold water conditions. It is clear that a leading commercial liquid laundry detergent mixture performs worse than a 1:1 blend of such a detergent mixture and a surfactant composition of this invention (C10 MLAS). Excellent cold water detergency performance was also observed for a 1:1 blend of such a detergent and the surfactant composition C10 LAS of this invention. In contrast to these results, a 1:1 blend of the commercial liquid laundry detergent mixture with a C1114 LAS (low 2-phenyl) surfactant sample shows a clear drop in cold water detergency performance.

According to the present invention it therefore has, most surprisingly, been found that a surfactant or detergent compositions comprising linear alkybenzenesulfonate (LAS), having a phenyl group attached to a hydrocarbon chain; wherein more than 30 wt. %, preferably more than 40 wt. %, most preferably more than 50 wt. %, of the LAS have a hydrocarbon chain that is C10 or less, preferably C9 or C10, most preferably C10, has:

extraordinary hard water tolerance and correlated thereto
good physical and application (washing) properties at higher $Ca^{2+}$ loads and cold water temperature, together with
an excellent tolerance to ionic strength.

The preferred LAS is high 2-phenyl preferably mono-methyl branched modified LAS (MLAS). The 2-phenyl isomer for LAS is the least soluble of the LAS phenyl isomers, and one would expect that a molecule that decreases bulk water solubility would lower the solubility content (Ksp) for the calcium-surfactant salt. However, contrary to this, LAS in the C10 or less range with a high 2-phenyl content has been shown to increase tolerance of calcium (raises the apparent Ksp) while reducing bulk solubility.

Use and Application

The MLAS of the present invention can be used as an anionic surfactant and is suitable, in particular, for detergents and cleaners, and for industrial and chemical-technical applications.

The disclosed MLAS can be applied in a wide range of household and industrial and institutional (I&I) cleaning formulations. Examples of typical applications include cleaners, hand dishwashing liquids, laundry detergents, laundry pre-spotters, dry cleaning products, and personal care products. The consumer cleaning products in accordance with the invention can take a variety of physical forms including liquids, gels, pastes, powders, granules, tablets, bars, and pouches.

The present invention likewise provides detergent and cleaning formulations which, as well as the customary constituents containing the MLAS of the present invention in concentrations of up to 50%, preferably from 0.1 to 25%, more preferably 0.1 to 15% by weight.

In addition to the MLAS of the present invention, the compositions and formulations of the present invention may contain also other anionic, nonionic or cationic surfactants, or mixtures thereof. Customary surfactants that can be used with the modified alkylbenzene sulfonates of this invention are, for instance, described by Kurt Kosswig in Ulmann's Encyclopedia of Industrial Chemistry, Vol. A25 (1994), p. 747-818. Surfactants typically are present in the compositions and formulations at levels from 1% to 60%.

Suitable anionic surfactants that can be present include sulphates or other sulfonate-type surfactants. Examples of other sulfonate-type surfactants include conventional linear alkylbenzene sulfonates, e.g. C10 to C13-LAS, C10 to C13-MLAS, C13 to C17 paraffin sulfonates, olefin sulfonates, alkyl or alkenyl sulfosuccinates, and ester sulfonates, e.g. methyl ester sulphonates, having chain lengths of 12 to 20 C atoms. Examples of sulphate-type surfactants include the monoesters of sulphuric acid with fatty alcohols of synthetic and natural origin, such as coconut fatty alcohol, tallow fatty alcohol, oleyl alcohol, C8 to C18 Ziegler alcohols, or C10 to C20 oxo alcohols. Fatty alcohol ether sulphates, such as lauryl ether sulphate, C12-C13 alcohol ether sulphates, and C12-C15 alcohol ether sulphates, may also be used.

Other suitable anionic surfactants are soaps, including saturated fatty acid soaps, such as the alkali metal or alkanolamine soaps of lauric acid, myristic acid, palmitic acid stearic acid. Soap mixtures derived from natural fatty acids, such as coconut, palm kernel or tallow fatty acids, are preferred.

Suitable nonionic surfactants include adducts of ethylene oxide and/or propylene oxide with alkylphenols, oxo alcohols or natural or Ziegler alcohols, fatty acids, fatty amines and fatty acid amides. The adducts of 3 to 15 mol of ethylene oxide with coconut and tallow fatty alcohols, or with synthetic alcohols having 8 to 18 C atoms are particularly preferred. Also alcohol-EO-PO adducts already on the market, as they are sold under the trade names Biodac® and Marlox® (Sasol), Plurafac® (BASF), Dehypon® LS (Cognis), and other suppliers can be used. Surfactants of the type comprising the C8 to C18-alkylpolyglucosides and amine oxides may also be used.

It is furthermore possible to use cationic surfactants and amphoteric surfactants, such as ampholytes and betaines, in the formulations.

Further common ingredients of detergents and cleaners include builders, enzymes, polymers, bleaches, bleach activators, fillers, carriers, processing aids, perfumes, dyes, solubilising agents, and for liquid formulations solvents.

Detergent builders are preferably included in the compositions herein, in solid formulations builders sometimes serve as adsorbents for the surfactants. Suitable builders include alkali metal silicate builders, aluminosilicate builders, such as zeolites, phosphates, phosphonates, polycarboxylates, or citrates. The compositions of the invention may comprise 0-70% builder components. Enzymes may also be included in the compositions in concentrations of up to 5% by weight, e.g. proteases, amylases, cellulases, and lipase enzymes or mixtures thereof.

Besides in the field of detergents and cleaners the MLAS of the invention can be applied in a wide range of further applications, including textile processing, metal processing, cooling lubricants, paints, oilfield chemicals, enhanced oil recovery (EOR), crop protection formulations, and industrial processing.

The above detailed description of the figures and the specific embodiments, together with the examples given below, are not intended to limit the invention's broader scope. The invention is susceptible to various modifications, equivalents and alternative forms, falling within the spirit and scope of the present invention as defined by the appended claims.

EXAMPLES

Surfactant samples were prepared by alkylating linear and methyl branched olefins with benzene across CBV20A H-Mordenite catalyst. These LAB and MLAB samples were sulfonated with $SO_3$ using a thin film sulfonation unit. Sulfonic acid product was neutralized with sodium hydroxide to achieve a 30% active sodium sulfonate.

The following surfactant samples were used:
1) C10 MLAS—high 2-phenyl, mono-methyl branched.
2) C10 LAS—high 2-phenyl, highly linear.
Other LAS species:
1) C1013 LAS—high 2-phenyl, linear.
2) C1213 MLAS—high 2-phenyl, mono-methyl branched.
3) C11 MLAS—high 2-phenyl, mono-methyl branched.
4) Solfodac® AC-3-H—low 2-phenyl, linear [commercially available C1013 LAS].
5) C1114 LAS low 2-phenyl—low 2-phenyl, linear.

Table 1 below provides the details of the Samples used in the tests:

TABLE 1

| Sample | C1013 LAS | C1213 MLAS | C11 MLAS | C10 MLAS | Solfodac® AC-3-H | C10 LAS | C1114 LAS low 2-phenyl |
|---|---|---|---|---|---|---|---|
| Average Molecular Weight (as Na salt) | 342.2 | 355 | 334.2 | 320.3 | ca. 343 | 320 | 359.6 |
| Average Carbon Chain Length | 11.6 | 12.5 | 11 | 10 | 11.6 | 10 | 12.8 |
| Total 2-Phenyl | 71.2 | 84 | 84.6 | 84.9 | ca. 31 | 76.9 | 15.3 |

TABLE 1-continued

| Sample | C1013 LAS | C1213 MLAS | C11 MLAS | C10 MLAS | Solfodac ® AC-3-H | C10 LAS | C1114 LAS low 2-phenyl |
|---|---|---|---|---|---|---|---|
| Content (wt. %) NMR | | | | | | | |
| C9 and Below Content (wt %) | 0.16 | 0 | 0 | 0.13 | 0.3 | 0 | 0 |
| C10 Content (wt. %) | 10.55 | 0 | 0.79 | 99.86 | 14 | 99.7 | 1.1 |
| C11 Content (wt. %) | 37.28 | 0.69 | 99.09 | 0.01 | 34 | 0 | 2.8 |
| C12 Content (wt. %) | 32.44 | 47.01 | 0.12 | 0 | 31 | 0.3 | 21.9 |
| C13 Content (wt. %) | 19.28 | 52.31 | 0 | 0 | 20 | 0 | 60.5 |
| C14 and Above Content (wt. %) | 0.08 | 0 | 0 | 0 | 0.5 | 0 | 13.7 |
| Average wt % Branching/LAB or MLAB (by NMR) | 18.0 | 116.0 | 105.0 | 90.0 | 9.8 | 10.6 | Not determined |
| Olefin Branching - MonoMethyl (wt. %) | 1.71 | 87.19 | 91.34 | 96.29 | 1.80 | 1.23 | 1.80 |
| Alkylation Catalyst | CBV 20A H-Mordenite | CBV 20A H-Mordenite | CBV 20A H-Mordenite | CBV 20A H-Mordenite | UOP Detal | CBV20A H-Mordenite | HF |
| Source of Paraffin/Olefin* | Olex | Isalchem 123 | Isalchem 11 | Isalchem 10 | Aug-Pacol 1014 | 1-Decene | LC-Pacol 1213 |

*The Sources of Paraffin/Olefin used to prepare LAS/MLAS samples:
Olex: The original raw material is Kerosene from crude oil. Essential characteristics of the olefins are linearity and internal olefins.
Isalchem 123, Isalchem 11, Isalchem 10: The original raw material is Kerosene (crude oil), used to prepare branched alcohols (Isalchem), dehydrated to produce methyl olefins.
Aug-Pacol 1014: C10-14 paraffin, extracted from kerosene, produced in Augusta, Italy.
Solfodac ® AC-3-H: The trade name of the sulphonated derivative of LAB produced via UOP Detal technology, available from Terranova.
LC-Pacol 1213: C10-14 paraffin, extracted from kerosene, produced in Lake Charles, USA Analytical Methodology:

The linear alkylbenzene (LAB) and modified linear alkylbenzene (MLAB) samples were analyzed using the following analytical procedures:

a. Capillary GC and Capillary GCMS to determine carbon chain length, weight percentages, and branching Samples were analyzed by capillary gas chromatography with flame ionization detection (FID) or Mass Spec (MS). The GC conditions are given below. The mass spectrometer was an Agilent MSD with electron impact.
Column: 15 m×0.25 mm×0.25 u DB-1 phase
Injector: 300°
Detector: 320°
Column flow: 1.26 ml/min
Split ratio: 100:1
Column ramp: 70°, hold 1 min, 6 deg/min to 200°, then 10 deg/min to 320°, hold 5 min
Pressure Program: 1.26 ml/min for 23 min then 10 ml/min/min to 2.5 ml/min
Injection size: 0.2 μl by autosampler Standards of known linear alkyl benzene were examined by GC with both FID and MS detection. The GC elution order, retention time, and mass spectrum were then compared to the compounds prepared here. The 2-Phenyl isomers have characteristic mass spectra with peaks at the molecular weight and 105 amu. Similarly, 3-Phenyl isomers have a peak in their mass spectra at 119 amu. Peaks assignments of the materials prepared here were made based on their retention time and mass spectrum. Methyl branched alkylate elutes prior to the corresponding linear homolog. Quaternary 2-methyl-2-phenyl alkylate have mass spectra with a 119 amu peak, but elute at a slight different time than the 3-phenyl isomer.

b. $^{13}$C NMR to determine branching and phenyl position in MLAB and LAB samples All samples were analyzed by $^{13}$C NMR on a Bruker AVANCE 500 MHz NMR using a 5 mm broadband probe. Important instrumental parameters are listed in Table 2.

Samples were prepared by combining 4.5 grams of product with 0.05 grams of p-dioxane internal standard (each weighed to the nearest 0.1 mg). 0.3 mL of this mixture was transferred to an NMR tube and dissolved in 0.2 mL deuterated methylene chloride lock solvent. Chromium acetyl acetonoate was added as a relaxation agent. After acquisition the spectra were manually phased, baseline corrected and integrated.

Spectra were manually phased and baseline corrected. The degree of branching for each MLAB sample was determined by normalizing the entire 13CNMR spectrum to 100 (solvent and internal standard resonances were excluded). Methyl resonances were identified using standard DEPT135 and DEPT90 experiments. The "percent methyl carbons" was converted to average branches per molecule by multiplication with the average carbon number of the sample (determined by GC) and subtracting 2 (to account for methyls of linear LAB).

TABLE 2

$^{13}$C NMR Acquisition and Processing Parameters

| NMR Parameter | $^{13}$CNMR |
|---|---|
| Acquisition Pulse Sequence (PULPROG) | zgig30 |
| Decoupling Pulse Sequence (CPDPRG2) | Waltz16 |
| Acquisition Mode (DIGMOD, AQ MOD) | Digital, qsim |
| Time Domain (TD) | 64K |
| Number of Scans (NS) | 10K |
| Number of Dummy Scans (DS) | 4 |
| Spectral Width (SWH) | 23810 Hz |
| Acquisition Time (AQ) | 1.376 sec |
| Recycle Delay (D1) | 15 sec |
| Receiver Gain (RG) | 10K |
| 90° Pulse Width, Observe (P1) | 10.25 μsec |
| Transmitter Attenuation, Observe (PL1) | 7.0 dB |
| 90° Pulse Width, Decoupling (PCPD2) | 100 μsec |
| Transmitter Attenuation, Decoupling (PL12) | 18.72 dB |
| Frequency Domain Points (SI) | 64K |
| Line Broadening (LB) | 1 Hz |
| Window Function (WDW) | EM |

TABLE 2-continued

13C NMR Acquisition and Processing Parameters

| NMR Parameter | $^{13}$CNMR |
|---|---|
| Sample Temperature | 28° C. |

Quaternary MLAB by $^{13}$CNMR

Spectra were manually phased and baseline corrected. The total quaternary MLAB content was determined by using the aromatic carbon of the 2-phenyl isomer and the benzylic carbon of the >2-phenyl isomers. The chemical shifts relative to TMS for each resonance are listed in Table 3. Quaternary carbons were verified using standard DEPT135 and DEPT90 13C NMR experiments. All integral values were assigned relative to the p-dioxane internal standard which was given an arbitrary value.

TABLE 3

Pertinent Resonance Locations for Quaternary MLAB Determination

| Quaternary Resonance | Chemical Shift (ppm) |
|---|---|
| 1,4-dioxane | 67.2 |
| 2-phenyl (aromatic) | 149.8 |
| >2-phenyl (benzylic) | 40.5-41.5 |

The invention is described and illustrated in more detail with reference to the following tests which illustrate the advantages of C10 MLAS and C10 LAS over other LAS species. Tests were performed to determine Intrinsic Detergency Performance, $Ca^{2+}$ Tolerance/Turbidity, Dynamic Surface Tension/$Ca^{2+}$ tolerance, Surface Tension/Surface Age and Salt (NaCl) Tolerance. In addition, the cold water soil removal abilities of the various surfactant samples were compared.

1. Intrinsic Detergency Performance:

The Intrinsic Detergency Performance was determined in laboratory washing machines at 40° C. cleaning temperature. Commercial test swatches with a surfactant sensitive pigment soil on polyester-cotton fabric were applied. Change in reflectance after washing was used to measure cleaning. The increase in Whiteness was determined by means of a reflectometer. The cleaning performance is expressed as % Whiteness. The surfactant concentration was 1000 ppm (reflecting the typical surfactant level of European wash conditions).

The test was carried out at 4 hardness levels: 0, 45, 90 and 180 ppm $Ca^{2+}$ hardness. For each product (C1013 LAS, C10 MLAS, C11 MLAS and C1213 MLAS), detergency measurements were carried out 6 times and the average value was calculated. The results are given in FIG. 1 along with the standard deviation.

2. $Ca^{2+}$ Tolerance/Turbidity:

The calcium ion tolerance was determined by the addition of $CaCl_2$ to a surfactant solution with a measurement of the transparency of the solution at 20° C.: 200 ml of a transparent surfactant solution of 1.0 g/l are stirred at 150 rpm in a thermostatted beaker. A $CaCl_2$ solution with 17800 ppm $Ca^{2+}$ (calculated as equivalent $CaCO_3$) was added at a rate of 0.03 ml/min or 2.67 ppm $Ca^{2+}$ per minute. The transparency of the solution was determined using a photo electrode Mettler DP550 and recorded automatically. The measurement was continued up to a final $Ca^{2+}$ concentration of 350 ppm. The experiments were carried out at both 25° C. and 40° C.

FIG. 2 compares the calcium ion tolerance of C10 MLAS with the commercial LAS (Solfodac® AC-3-H), as well as 70/30 wt. % and 90/10 wt. % mixtures of C10 MLAS with commercial LAS at 20° C.

FIG. 3 compares the hard water tolerance of C10 MLAS with C1013 LAS, and 10/90 wt. %, 30/70 wt. % and 50/50 wt. % mixtures of C10 MLAS and C1013 LAS at 20° C. FIG. 4 shows the results obtained for the same experiments, carried out at 40° C.

3. Dynamic Surface Tension/$Ca^{2+}$ Tolerance:

A 500 ml solution of the surfactant was circulated continuously with a pulse free pump (Ismatec BVP-2, pump head 1409601) through a vessel and a measuring cell. The dynamic surface tension was measured with a Lauda MPT2 (bubble pressure tensiometer) at a constant air flow rate of 20 mm$^3$/s. The actual surface age varies in dependence of the surface tension but is on the order of magnitude of 0.1 s. The vessel was thermostatted and the solution was stirred at 300 rpm. A $CaCl_2$ solution with 17800 ppm $Ca^{2+}$ (calculated as equivalent $CaCO_3$) was added to the vessel at a rate of 0.075 ml/min or 2.67 ppm $Ca^{2+}$ per minute. The measurement was continued up to a final $Ca^{2+}$ concentration of 350 ppm.

FIG. 5 shows the surface tension qualities of C10 LAS and C10 MLAS at $Ca^{2+}$ concentrations at 50 ppm, and above, compared to other LAS species, specifically C1013 LAS and Sulfodac® AC-3-H.

FIGS. 6 and 7 compare the interfacial activity (surface tension) with regard to surface age, of the neat surfactant samples (C10 MLAS, Sulfodac® and C1013 LAS) as well as the behavior of mixtures of C10 MLAS and other LAS species, at 25° C. and 90 ppm $Ca^{2+}$. For both examples, the surface age was reduced stepwise from 10 s down to 0.01 s.

FIG. 6 shows 10 wt. %, 30 wt. % and 50 wt. % mixtures of C10 MLAS with commercial LAS (Solfodac® AC-3-H), compared to the neat samples. FIG. 7 displays the results obtained for a 50 wt. % mixture of C10 MLAS and C1013 LAS, compared to the neat samples.

4. Surface Tension/Surface Acre:

The dynamic surface tension of a surfactant solution with a concentration of 1.0 g/l was measured with a bubble pressure tensiometer Lauda MPT 2 at 25° C. and 40° C. The $Ca^{2+}$ concentration was kept constant at 180 ppm for all experiments. The surface age was reduced stepwise from 10 s down to 0.01 s for all experiments.

FIG. 8 compares the interfacial activity (surface tension) of mixtures of 10 wt. %, 30 wt. % and 50 wt. % C10 MLAS with commercial LAS (Solfodac® AC-3-H) at 25° C., as well as for neat C10 MLAS and Sulfodac samples. Mixtures of 10 wt. % and 50 wt. % C10 MLAS with C1013 LAS, as well as neat C10 MLAS and C1013 LAS were also evaluated at 25° C. Results are shown in FIG. 9. FIGS. 10 and 11 show the results obtained when the same experiments were repeated at 40° C.

5. Salt (NaCl) Tolerance:

200 ml of a transparent surfactant solution of 1.0 g/l was stirred at 150 rpm in a thermostatted beaker at 20° C. A 25% NaCl solution was added at a dosage rate of 1 ml/min. The transparency of the solution was determined using a photo electrode Mettler DP550. Results for C10 MLAS are compared to Solfodac® AC-3-H in FIG. 12.

6. Cold Water Detergency Performance: Ability to Remove Solid Soil

A soil dipping apparatus was used to measure the ability of various surfactant solutions to remove solid, lard soil from soil-impregnated cotton fabric. The procedure consisted of the following steps:

Standard 30 mm round cotton fabric pieces (coupons), commonly used for measuring cotton wetting, were weighed, and then submersed in melted lard, which added approximately 200 mg of melted lard soil to each coupon; coupons were allowed to air dry and then were reweighed to determine the weight of soil on each cloth coupon.

Test surfactant solutions were contained in individual 250 ml wide-mouth glass bottles, all bottles setting in a controlled-temperature bath set at 16° C.

Soiled coupons were held by metal alligator clips attached to a rack designed to move coupons in and out of the test solutions, driven by a vacuum-based motor.

All coupons were simultaneously lowered into their respective surfactant solutions for 1 period of 1 hour, and then were dipped in and out of the test solutions 200 times at a rate of 1 dip/1.5 seconds. Test solutions were then replaced by distilled water and coupons were again dipped 200 times, at a rate of 1 dip/1.5 seconds, to rinse remaining surfactant solution from the coupons Coupons were air-dried for 24 hours, and reweighed to determine the change in weight that occurred as a result of being submersed in the surfactant solutions.

The ability of short-chain C10 MLAS to facilitate cold water detergency was examined by comparing its performance vs. "Tide™ Coldwater Liquid Laundry Detergent" available from Proctor & Gamble, which is a leading liquid laundry detergent in North America that is designed (and advertised) for cold water detergency performance. Test solutions consisted of the following:

Test Solution 1, labeled "DET" consisted of 0.1% active liquid laundry detergent (described above), diluted with distilled water containing 0.01 molar sodium chloride (to buffer ion strength) and 50 mg calcium (as $CaCO_3$, to represent water hardness), and adjusted with sodium hydroxide to achieve a pH equal to 8. The composition of the detergent was examined and determined to have an overall surfactant active content of 33.5%, which was used to produce a 0.1% active solution.

Test Solution 2, labeled "DET: C1114 LAS low 2-phenyl" consisted of a 1:1 blend (0.05%, by weight, of each ingredient), where the C1114 LAS low 2-phenyl represents standard C12-average commercial LAS; test solution was adjusted for ionic strength, water hardness and pH as described above for Test Solution 1.

Test Solution 3, labeled "DET: C10 MLAS" consisted of a 1:1 blend (0.05%, by weight, of each ingredient), where the C10 MLAS consisted of an alkylbenzenesulfonate made from a C10-alkylbenzene having a 2-phenyl isomer content greater than 80%, and having greater than 40% branching (mostly methyl) along the alkyl chain; test solution was adjusted for ionic strength, water hardness and pH as described above for Test Solution 1

Test Solution 4, labeled "DET: C10 LAS" consisted of a 1:1 blend (0.05%, by weight, of each ingredient), where the C10 LAS consists of an alkylbenzenesulfonate made from a C10-alkylbenzene having a 2-phenyl isomer content of about 70%, and having a negligible amount of branching along the alkyl chain; test solution was adjusted for ionic strength, water hardness and pH as described above for Test Solution 1.

Test solutions were subsequently examined as described in the test protocol, given above. Results are shown in FIG. 13.

7. Use and Applications

Typical formulation examples to use the MLAS of this invention in cleaners (Example 7.1), washing-up liquids (Example 7.2), laundry liquids (Example 7.3), laundry powders (Example 7.4), drilling fluids (Example 7.5), fracturing fluids (Example 7.6) and EOR applications (Example 7.7) are given below.

Example 7.1

Cleaner

| | |
|---|---|
| C10 MLAS, Na salt | 3% |
| C13 alcohol ethoxylate-9EO | 4% |
| Butyldiglycol | 6% |
| Sodium citrate dehydrate | 2% |
| Water, perfume oil, colour, preservative | to 100 |

Example 7.2

Washing-Up Liquid

| | |
|---|---|
| C10 MLAS, Na salt | 12% |
| Sodium lauryl ether sulphate, 70% | 10% |
| Cocoamido propylbetaine, 30% | 6% |
| Water, perfume oil, colour, sodium chloride, preservative | to 100 |

Example 7.3

Laundry Liquid (HDL)

| | |
|---|---|
| C1215 alcohol ethoxylate-7EO | 15% |
| C10 MLAS, Na salt | 12% |
| Coco fatty acid | 5% |
| Aqueous KOH 50% to pH 8.5 | |
| Citrate-Na | 3% |
| Phosphonate-Na | 1% |
| Sodium cumene sulphonate 40% | 4% |
| Propylene glycol | 5% |
| Water, perfume oil, colour, preservative | to 100 |

Example 7.4

Laundry Powders

| Composition | A | B |
|---|---|---|
| Zeolite A | 27% | — |
| Phosphate-Na (STPP) | — | 20% |
| C10-C13 LAS, Na salt | 4% | 8% |
| C10 MLAS, Na salt | 4% | 8% |
| Powder soap (Na salt, tallow based) | 1% | 3% |
| C1214 alcohol ethoxylate-7EO | 4% | — |
| Polycarboxylate | 3% | — |
| Sodium disilicate | 5% | 10% |
| Sodium carbonate | — | 15% |
| Sodium citrate | 2% | — |
| Sodium percarbonate | 18% | — |
| Tetraacetylethylenediamine (TAED) | 4% | — |
| Carboxymethylcellulose | 1% | 1% |
| Enzymes | 2% | — |
| Sodium sulphate | to 100% | to 100% |

Composition A: Zeolite-built powder formulation (phosphate free)
Composition B: Phosphate-built powder formulation

Example 7.5

80/20 Invert Emulsion Non-Aqueous Drilling Fluid
(Specific Gravity 1.56)

| Component | Quantity (wt %) |
| --- | --- |
| Synthetic drilling fluid base oil | 30% |
| Organoclay | 1% |
| Lime | 1.5% |
| Primary emulsifier | 1.5% |
| C10 MLAS, Na salt | 1% |
| 25% CaCl2 Brine | 13.5% |
| Barite | 51.5% |

Example 7.6

45% Active Guar Gum Suspension Fracturing Fluid

| Component | Quantity (wt. %) |
| --- | --- |
| Synthetic base oil | 52% |
| C10 MLAS, Na salt | 1% |
| Organoclay | 2% |
| Guar gum | 45% |

Example 7.7

Composition for Alkaline Surfactant Polymer
Enhanced Oil Recovery Flood

| Component | Quantity (wt %) |
| --- | --- |
| C10 MLAS, Na salt | 0.10% |
| C6 Alcohol ethoxylate - 3.5 EO | 0.20% |
| 50% NaOH | 1.0% |
| Poly(acrylamide) polymer | 0.125% |
| Water | to 100% |

The invention claimed is:

1. A surfactant composition comprising alkylarylsulfonate molecules wherein more than 50 wt. % of the alkylarylsulfonate molecules of the surfactant composition are species of the formula:

$$[R-X-Ar(SO_3)^-]_a[M^{n+}]_b$$

wherein:
X is a linear acyclic aliphatic hydrocarbyl chain;
R is bound to a non-terminal carbon atom of X and is selected from C1 to C3 alkyl groups;
X and R together consist essentially of 10 carbon atoms;
Ar is an aromatic group;
M is a cation or cation mixture,
n is selected from 1, 2 and 3; and
a and b are selected such that the alkylarylsulfonate molecule is electroneutral; and
wherein more than 20 wt % of the alkylarylsulfonate molecules of the surfactant composition have an R which is methyl; and
more than 40 wt % of the alkylarylsulfonate molecules of the surfactant composition have the aryl group bound to the carbon atom which is bound to either of the two terminal carbon atoms of X, which is the beta position on the hydrocarbyl chain X.

2. The surfactant composition as claimed in claim 1, wherein the alkylarylsulfonate molecules are alkylbenzenesulfonate.

3. A surfactant composition as claimed in claim 2, further comprising one or more additives selected from the group consisting of:
a. co-surfactants
b. water-soluble polymers
c. enzymes
d. builders
e. bleaches
f. acids
g. bases and
h. fragrances.

4. The surfactant composition as claimed in claim 3, comprising other alkylarylsulfonate species or isomeric mixtures of alkylarylsulfonate species, (for example an isomeric mixture of molecules having an acyclic aliphatic hydrocarbon chain (hydrophobe) with from 9 to 14 carbon atoms per molecule, or having the same number of C11 to C14 carbon atoms in its hydrophobe chain).

5. The surfactant composition as claimed in claim 4, comprising alkylarylsulfonate species as defined in claim 1, and other alkylarylsulfonate species at a ratio of greater than 30:70, up to a ratio of 50:50.

6. A surfactant formulation comprising a surfactant as claimed in claim 1 in an aqueous solution.

7. The formulation of claim 6, wherein the aqueous solution has a high $Ca^{2+}$ or $Mg^{2+}$ concentration above 50 ppm (based on weight/weight).

8. The formulation of claim 6, wherein the aqueous solution has a concentration of NaCl above 3 wt. %.

9. The formulation of any one of claims 7 to 8, wherein the aqueous solution is at a temperature of 5 to 65° C.

10. The composition as claimed in claim 1, wherein X and R together have 10 carbon atoms.

11. A composition comprising alkylaryl molecules wherein more than 50 wt. % of the alkylaryl molecules of the composition are of the formula:

$$R-X-Ar$$

wherein:
X is a linear acyclic aliphatic hydrocarbyl chain
R is bound to a non-terminal carbon atom of X and is selected from C1 to C3 alkyl groups;
X and R together consist essentially of 10 carbon atoms;
Ar is an aromatic group; and
wherein the composition is used in the manufacture of a surfactant composition containing alkylarylsulfonate molecules;
wherein more than 20 wt % of the alkylarylsulfonate molecules of the surfactant composition have an R which is methyl; and
more than 40 wt % of the alkylarylsulfonate molecules of the surfactant composition have the aryl group bound to the carbon atom which is bound to either of the two terminal carbon atoms of X, which is the beta position on the hydrocarbyl chain X.

12. The composition as claimed in claim 11, wherein the alkylaryl molecules are alkylbenzene.

13. The composition as claimed in claim 11, wherein X and R together have 10 carbon atoms.

* * * * *